3,266,361
MITER JOINT NAIL

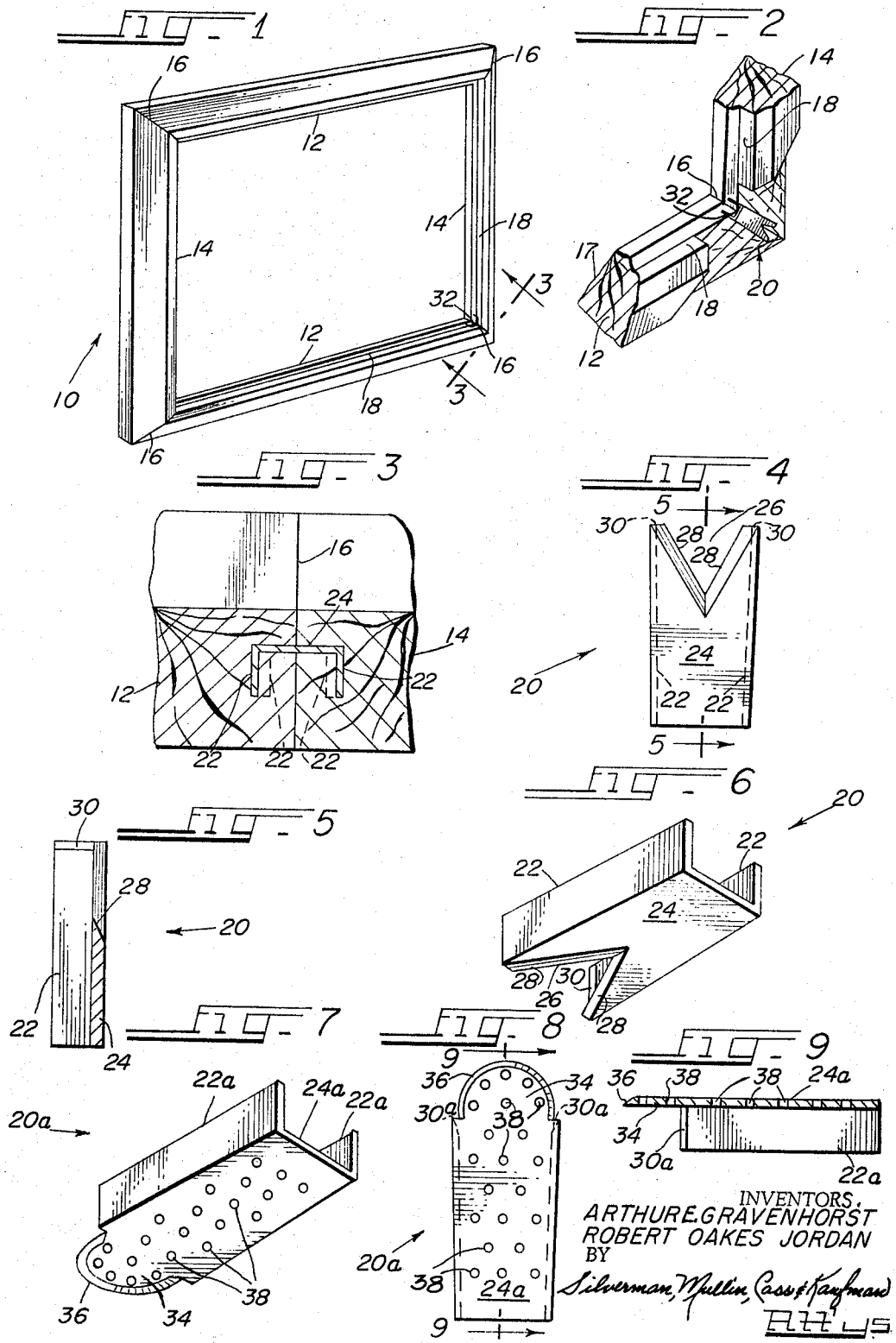

Arthur E. Gravenhorst, Deerfield, and Robert Oakes Jordan, Highland Park, Ill., assignors to Metalcraft Corp., Chicago, Ill.
Filed Aug. 9, 1963, Ser. No. 300,980
2 Claims. (Cl. 85—11)

This invention relates generally to the construction of miter or angle joints in structures made of wood or the like, and more particularly to a nail for connecting and maintaining the miter joints in closed polygonal structures such as picture frames.

In the carpentry and woodworking arts, angle or miter joints are constructed and connected in a variety of ways, such as, by the use of clamps, brackets, ordinary nails, tongues and grooves, glues, etc. Photo or picture frames are generally rectangular in configuration and made with four mitered corner joints. When the picture frames are made of woods or similar materials, any of the described fastening means may of course be employed. However, the described means are objectionable for one or more reasons including impossibility of concealment which destroys esthetic appearance, inherent lack of strength, and excessive cost. The problem of excessive cost is extremely pertinent and acute in the mass-production manufacture of inexpensive picture frames.

In an effort to overcome the problems alluded to, manufacturers of picture frames have heretofore employed a connector commonly known as a draw nail. Briefly, the draw nail heretofore used comprised a relatively broad nail of generally I-beam configuration. The flat connecting segment projected forwardly beyond the short side legs and terminated in a slightly concave blade-like nail tip. The flat connecting segment likewise tapered slightly in width from leading edge to trailing edge. To make a joint, the draw nail was driven simultaneously into two abutting mitered frame members from inside the angle described by the members. The draw nail was driven until it was countersunk within the frame member material, and the nail's short side legs and tapering connecting segment cooperated to draw the two frame members permanently together.

While the described I-beam draw nail constituted a great improvement over other known forms of connecting means, it was nonetheless characterized by certain disadvantageous features. Thus, for example, the solid and unbroken mass of the broad connecting segment made no provision for accommodating the wood or other material which was necessarily displaced when the nail was driven in. As a result, cracking or fracturing of the frame members invariably resulted. Consequently, to overcome this major objection it was necessary to first cut a slot into which the nail was directed. The slot was formed with arcuate inwardly-converging sides into which the side legs of the nail were driven to angularly bisect the same. The displaced wood was then accommodated in the slot space. The pre-slotting of the frame did indeed substantially reduce the incidence of cracking, but the added work and cost was oft-times prohibitive.

Included among the other objections was the fact that the I-beam configuration made the connecting segment unnecessarily long because the blade-like tip necessarily projected beyond the shorter side legs in order that the nail could make proper entry into the wood. As a result, it was virtually impossible to use these draw nails with small or narrow frame members. Similarly, while the short side legs projected above and below the connecting segment, these projections generally were too short to afford firm engagement of the wood into which the nail was driven. Lengthening of the side legs was frequently impossible because of the limited thickness of the frame members, particularly in small, mass-produced photo frames. Moreover, since the prior draw nails had only the single concave piercing edge, it was frequently difficult to drive the same into the frame members or maintain the desired angle of entry.

It is therefore an important object of this invention to provide a nail for making angle or miter joints which overcomes all of the disadvantages of the prior draw nails.

Another object is to afford a miter joint nail of the character described which is channel-shaped in section as contrasted with the prior I-beam section draw nails. A related object is to afford such as angle joint nail in which the channel side legs, being of greater dimension than one-half of the I-beam legs, function to effectively bite or grip the material into which the nail is driven over the full length of said legs. The miter joint nail thus affords greater effective gripping surface and strength than a comparably sized I-beam type draw nail.

A further object is to provide a miter joint nail of the character described which permits accommodation of the compacted or displaced frame member material, thereby greatly reducing or eliminating cracking of the frame members and eliminating the necessity for pre-slotting the frame.

Still another object is to afford an angle joint nail of the character described having a plurality of cutting or penetrating edges, thereby facilitating the driving thereof into the frame members.

Yet another object is to provide a miter joint nail of the character described which does not require any projecting portion beyond the channel side legs so that the nail may be made in shorter lengths for use in narrow frame members.

Still a further object is to afford an angle joint nail of the character described which invariably maintains the desired angle of penetration once the leading edges thereof have entered the frame member material.

Yet a further object is to provide an angle joint nail of the character described which may be inexpensively manufactured and yet is most efficient and simple to use for providing a stronger joint than heretofore obtainable with prior similar nails.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings preferred embodiments thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a rear perspective view of a typical picture frame made of mitered strips of molding assembled with miter joint nails embodying the principles of the invention;

FIG. 2 is an enlarged fragmentary rear perspective view of a corner of the picture frame with portions broken away to show the operational positioning of the miter joint nail;

FIG. 3 is an enlarged fragmentary sectional view taken on the plane of line 3—3 in FIG. 1 and viewed in the direction indicated;

FIG. 4 is a top plan view of the preferred form of miter joint nail;

FIG. 5 is a sectional view taken on the plane of line 5—5 in FIG. 4 and viewed in the direction indicated;

FIG. 6 is an inverted perspective view of the preferred form of miter joint nail;

FIG. 7 is an inverted perspective view of a modified form of the invention;

FIG. 8 is a plan view thereof; and

FIG. 9 is a sectional view taken on the plane of line 9—9 in FIG. 8 and viewed in the direction indicated.

Referring more particularly to the various figures of the drawings, the reference numeral 10 indicates generally a photo or picture frame constructed from a plurality of lengths of miter cut molding strips assembled with the miter joint nails of the invention. Typically, the frame 10 is rectangular in configuration and comprises a pair of side frame or molding strip member 12, 12, and a pair of end frame members 14, 14, said frame members being connected together in mitered corner joints such as 16. The frame members may be made of wood in any desired esthetically pleasing or sculptured form, and thus may include an inwardly tapering front face 17 and a concealed shoulder or recess 18 for accommodating therein a photo, a pane of glass and a backing material in the customary manner.

Each of the corner joints 16 is securely formed and maintained by means of a novel miter joint nail indicated generally by the numeral 20 (see FIG. 2).

Turning to FIGS. 4, 5 and 6, it will be seen that the nail 20 comprises a channel-shaped member having a pair of legs 22, 22, interconnected by a web segment 24. At its forward or leading edge, the web segment 24 is cut away to provide a V-shaped opening 26 which is defined by a pair of blade-like penetrating edges 28, 28. The leading edges of the legs 22 are likewise sharpened to afford a pair of blade-like penetrating edges 30, 30. It will thus be appreciated that the nail 20 includes four cutting or penetrating edges 28, 28, 30 and 30, and it should likewise be noted that the web segment 24 tapers in width from leading edge to trailing edge.

To construct a corner joint 16, it is simply necessary to drive a nail 20 into an adjoining pair of frame or molding strip members 12 and 14, preferably through the recessed shoulder 18. The four cutting edges of course facilitate the driving operation and the nail is driven in, by means of a suitable tool, until the same is completely countersunk within the frame members. Thereafter, the only visible evidence of the nail's presence is a channel-shaped slit such as 32 which may then be covered or filled with a wood filler, or the like, or even left uncovered because the same is concealed by the marginal edges of the photo or picture assembly during normal use of the frame in any event. No pre-slotting of the frame members is necessary.

It is important to recognize the action of the nail 20 as the same is driven into the frame members. Those skilled in the art will thus appreciate that the opening 26 affords space for accommodating the compacted or displaced wood. The legs 22 effectively grip or bite the wood over the full length thereof, and since the web segment 24 tapers rearwardly, the legs 22 serve to securely draw the frame members 12 and 14 together (see FIG. 3). The greater effective gripping power of the legs 22 likewise serves to maintain the nail true in the desired angle of penetration. This is particularly important because the nails are necessarily driven in a plane parallel to the front face 17 of the frame, and said front faces are frequently tapered or angular as indicated.

In FIGS. 7, 8 and 9 there is shown a modified form of the miter joint nail of the invention wherein similar parts are identified by like reference numerals but with the suffix "a" added thereto. It will thus be seen that the nail 20a comprises a channel-shaped member having a pair of legs 22a, 22a, interconnected by a web segment 24a. The leading edges of the legs 22a comprise blade-like penetrating edges 30a, 30a. In this instance, the web segment 24a has no opening like 26, but is instead formed with an integral forwardly projecting segment 34 which may be semi-circular in configuration as indicated. The marginal edge of the projecting segment 34 comprises a blade-like penetrating edge 36. It is important to note that the web segment 24a and the segment 34 are formed with a plurality of perforations or openings 38 therethrough.

The function of the nail 20a is substantially identical with that of the nail 20, but it will be appreciated that since the nail 20a is longer by virtue of the projecting segment 36, its use will be indicated or desirable when the frame or molding strip members are unusually wide. It will likewise be appreciated that the openings 38 serve to accommodate the displaced frame member material to insure against splitting and fracturing of the frame members. Thus, like the principal embodiment no pre-slotting is necessary.

From the foregoing description and drawings, it should be apparent that we have provided a novel draw-type nail which may be utilized for quickly and efficiently making angle or miter joints. The channel-shaped nail which has a plurality of penetrating edges insures ease of penetration and provides greater gripping power than heretofore obtainable with prior similar nails. In addition, the openings in the nail's web segment permits accommodation of the displaced frame member material, thereby insuring against cracking and fracturing and eliminating the pre-slotting operation heretofore universally utilized.

It is believed that our invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of our invention as defined in the appended claims.

What we claim and desire to secure by Letters Patent of the United States is:

1. A miter joint nail for joining together adjacent molding strips of a picture frame comprising; an integral channel-shaped member having a web segment affording a top and bottom side and a pair of legs, said legs extending outwardly from said bottom side only of said web segment to firmly grip said material for maintaining said nail in the desired angle of penetration, a plurality of penetrating blades at the leading edges of said member, and means on said web segment for accommodating molding strip material displaced when said nail is operationally driven into said molding strips, said web segment tapering and decreasing in width from leading edge to trailing edge, said legs and said tapered web coacting to securely draw said molding strips together.

2. The nail of claim 1 in which said means comprises a V-shaped cut-out opening to said leading edges, the wide part of said V-shaped cut-out being at said leading edge, a pair of said blades defining the sides of said cut-out, and one of said blades at the leading edge of each of said legs.

References Cited by the Examiner

UNITED STATES PATENTS

| | | | |
|---|---|---|---|
| 1,822,217 | 9/1931 | Hudson | 20—92 |
| 1,934,134 | 11/1933 | McChesney | 85—11 |
| 1,959,360 | 5/1934 | Heyser | 85—11 X |
| 2,398,603 | 4/1946 | Soderberg | 85—49 |

FOREIGN PATENTS 948,459  8/1956  Germany.

OTHER REFERENCES

German printed application R 1,259, Mar. 8, 1956, Grieb.

EUGENE R. CAPOZIO, *Primary Examiner.*

JEROME SCHNALL, *Examiner.*

WENCELSO J. CONTRERAS, *Assistant Examiner.*